Dec. 18, 1956  G. H. COOK  2,774,280
OPTICAL OBJECTIVES COMPRISING SIX AIR
SPACED COMPONENTS IN AXIAL ALIGNMENT
Filed May 11, 1953
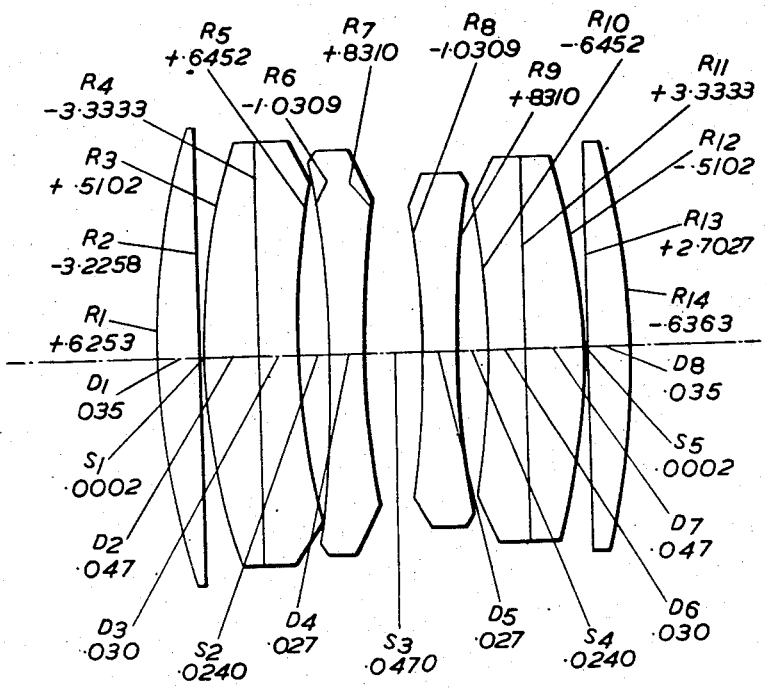
Inventor
GORDON H. COOK
By
Holcombe Wetterill & Brisebois
Attorney

United States Patent Office 2,774,280
Patented Dec. 18, 1956

2,774,280

OPTICAL OBJECTIVES COMPRISING SIX AIR SPACED COMPONENTS IN AXIAL ALIGNMENT

Gordon Henry Cook, Leicester, England, assignor to Taylor, Taylor & Hobson Limited, Leicester, England, a British company Application May 11, 1953, Serial No. 354,270

Claims priority, application Great Britain May 14, 1952

12 Claims. (Cl. 88—57)

This invention relates to optical objectives for photographic or other purposes, corrected (for a substantial spectrum range including at least a portion of the visible spectrum) for spherical and chromatic aberrations, coma, astigmatism, field curvature and distortion.

One well-known type of objective of this kind, giving a high degree of correction for such aberrations for a relatively high aperture, comprises two compounds meniscus components with their concave air-exposed surfaces facing one another and located between two simple convergent outer components. United States of America Patent No. 2,348,667 relates to a modification of such known objective, giving in addition much improved correction for oblique spherical aberration, by the inclusion of an additional component, namely a simple divergent component located between the two compound meniscus components.

The present invention has for its object to provide an improved objective, covering medium fields at medium relative apertures, and having such good correction for all the aberrations as to give a high degree of performance when made in long focal lengths and when photographing objects containing detail of low contrast. These requirements demand a much better correction for oblique spherical aberration and for skew ray errors than has hitherto been obtained. It is also very desirable for certain applications to provide reasonable freedom from vignetting, and this calls for such good correction of the oblique aberrations as to make it possible to use larger diameters than are required for the axial beam alone.

The objective according to the present invention comprises six components, of which the first, second, fifth and sixth (counting from the front) are convergent and the third and fourth are divergent and biconcave, wherein the second and fifth components are compound meniscus components having their air-exposed surfaces concave inwards and each consist of an inner divergent element cemented to an outer convergent element whose mean refractive index exceeds that of the associated divergent element by more than .05.

It should be made clear that the terms "front" and "rear" are used herein to indicate the sides of the objective respectively nearer to and further from the longer conjugate in accordance with the usual convention.

Preferably, the arithmetic mean of the equivalent focal lengths of the first and sixth components lies between 1.8L and 2.7L, that of the second and fifth components between 3L and 10L, and that of the third and fourth components between −2.2L and −1.5L, where L is the overall axial length of the objective from the front surface of the first component to the rear surface of the sixth component. The sum of the axial thicknesses of the second and fifth components preferably lies between .25L and .67L.

The arithmetic mean of the curvatures of the front surface of the second component and the rear surface of the fifth component conveniently lies between 1.4 and 2.2 times the arithmetic mean of the curvatures of the four surfaces of the third and fourth components. The sum of the axial lengths of the front and rear air spaces may be less than .02 times the equivalent focal length of the objective. When these relationships are observed for an objective serving the stated purpose, its overall axial length will be between 0.2 and 1.0 times its equivalent focal length.

The accompanying drawing illustrates a convenient practical example of objective according to the invention, this example having been designed for a special purpose and being corrected for a spectrum range including the red end of the visible spectrum and a portion of the infrared range, the best performance of the objective being obtained at a wave-length of $768\mu$.

Numerical data for this example are given in the following table, in which $R_1$ $R_2$ ... represent the radii of curvature of the individual surfaces, the positive sign indicating that the surface is convex to the front and the negative sign that it is concave thereto, $D_1 D_2$ ... represent the axial thicknesses of the various elements, and $S_1 S_2$ ... represent the axial air separations between the components. The table also gives the mean refractive indices $n_D$ for the D-line of the spectrum and the Abbé V numbers of the materials used for the elements of the objective.

The insertion of equals (=) signs in the radius columns of the table, in company with plus (+) and minus (−) signs which indicate whether the surface is convex or concave to the front, is for conformity with the usual Patent Office custom and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the table may have to be treated as negative for some calculations as is well understood in the art.

[Equivalent Focal Length 1.000    Relative Aperture F/3.5.]

| Radius | Thickness or Air Separation | Refractive Index $n_D$ | Abbé V Number |
|---|---|---|---|
| $R_1 = +.6253$ | $D_1 = .035$ | 1.65100 | 55.8 |
| $R_2 = -3.2258$ | $S_1 = .0002$ | | |
| $R_3 = +.5102$ | $D_2 = .047$ | 1.65100 | 55.8 |
| $R_4 = -3.3333$ | $D_3 = .030$ | 1.52630 | 51.0 |
| $R_5 = +.6452$ | $S_2 = .0240$ | | |
| $R_6 = -1.0309$ | $D_4 = .027$ | 1.67270 | 32.2 |
| $R_7 = +.8310$ | $S_3 = .0470$ | | |
| $R_8 = -1.0309$ | $D_5 = .027$ | 1.67270 | 32.2 |
| $R_9 = +.8310$ | $S_4 = .0240$ | | |
| $R_{10} = -.6452$ | $D_6 = .030$ | 1.52630 | 51.0 |
| $R_{11} = +3.3333$ | $D_7 = .047$ | 1.65100 | 55.8 |
| $R_{12} = -.5102$ | $S_5 = .0002$ | | |
| $R_{13} = +2.7027$ | $D_8 = .035$ | 1.65100 | 55.8 |
| $R_{14} = -.6363$ | | | |

In this example the diameters of the first, second, fifth and sixth components are respectively .36F, .33F, .30F and .32F, the rear surface $R_5$ of the second component and the front surface $R_{10}$ of the fifth component being chamfered off respectively to .27F and .23F, whilst the chamfer diameters of the surfaces $R_6$, $R_7$, $R_8$ and $R_9$ of the third and fourth components are respectively .30F, .24F, .23F and .26F, where F is the equivalent focal length of the whole objective. The equivalent focal lengths of the six components are respectively .82F, 1.85, —.68F, —.68F, 1.85F and .82F, the third and fourth components being divergent and the other four convergent. These focal lengths, in terms of the overall axial length L of the objective (this being .373F) work out at 2.2L, 5.0L, —1.8L, —1.8L, 5.0L and 2.2L respectively. The refractive index difference between the two elements in each compound component is .12470. The sum of the axial thicknesses of the two compound components is .154F or .412L.

As is well-known in the art, an increase in the relative aperture of the objective involves larger diameters for the components and this in turn necessitates longer overall axial length, which must be accompanied by increased focal lengths for the individual components. There is thus a relationship between the focal lengths of the components and the ratio between the equivalent focal length of the whole objective and its relative aperture such that where the said ratio is between F/2 and F/4, the arithmetic mean of the focal lengths of the first and sixth components lies between 2.3 and 3.5 times the said ratio, that of the second and fifth components between 4 and 13 times the said ratio and that of the third and fourth components between 2 and 3 times the same ratio.

The arithmetic mean of the curvature of the surfaces $R_3$ and $R_{12}$ is 1.96F and that of the surfaces $R_6$, $R_7$, $R_8$ and $R_9$ is 1.085F, so that the ratio between these two means is 1.85. The sum of the front and rear air separations $S_1$ and $S_5$ is .0004F. This example is well-corrected (for a spectrum range at the red end of the spectrum overlapping the infrared) over a semi-angular field of 23 degrees.

It will be appreciated that this example can be modified in various ways within the scope of the invention, for example so as to be corrected for the usual photographic spectrum range.

What I claim as my invention and desire to secure by Letters Patent is:

1. An optical objective for photographic and other purposes corrected (at least for a substantial portion of the visible spectrum) for spherical and chromatic aberrations, coma, astigmatism, field curvature and distortion, and comprising six components in axial alignment of which the first, second, fifth and sixth counting from the front are convergent and the third and fourth are divergent and biconcave, the second and fifth components being compound meniscus components having their air-exposed surfaces concave inwards toward the third and fourth components, such second and fifth components each consisting of an inner divergent element cemented to an outer convergent element the mean refractive index of the material of such convergent element exceeding that of the associated divergent element by more than .05, the arithmetic mean of the equivalent focal lengths of the first and sixth components lying between 1.8L and 2.7L, that of the second and fifth components between 3L and 10L, and that of the third and fourth components between —2.2L and —1.5L, where L is the overall axial length of the objective from the front surface of the first component to the rear surface of the sixth component and wherein the said overall axial length (L) is substantially 0.373 times the equivalent focal length (F) of the whole objective.

2. An optical objective for photographic or other purposes corrected (at least for a substantial portion of the visible spectrum) for spherical and chromatic aberrations, coma, astigmatism, field curvature and distortion, and comprising six components in axial alignment of which the first, second, fifth and sixth counting from the front are convergent and the third and fourth are divergent and biconcave, the second and fifth components being compound meniscus components having their air-exposed surfaces concave inwards towards the third and fourth components, such second and fifth components each consisting of an inner divergent element cemented to an outer convergent element the mean refractive index of the material of such convergent element exceeding that of the associated divergent element by more than .05, the arithmetic mean of the curvatures of the front surface of the second component and the rear surface of the fifth component lying between 1.4 and 2.2 times that of the four surfaces of the third and fourth components and wherein the said overall axial length of the objective is between 0.2 and 1.0 times the equivalent focal length of the whole objective.

3. An optical objective as claimed in claim 2, in which the sum of the axial lengths of the front and rear air spaces is less than .02 times the equivalent focal length of the objective.

4. An optical objective for photographic or other purposes corrected (at least for a substantial portion of the visible spectrum) for spherical and chromatic aberrations, coma, astigmatism, field curvature and distortion, and comprising six components in axial alignment of which the first, second, fifth and sixth counting from the front are convergent and the third and fourth are divergent and biconcave, the second and fifth components being compound meniscus components having their air-exposed surfaces concave inwards towards the third and fourth components, such second and fifth components each consisting of an inner divergent element cemented to an outer convergent element the mean refractive index of the material of such convergent element exceeding that of the associated divergent element by more than 0.15, the arithmetic mean of the equivalent focal lengths of the first and sixth components lying between 2.3 and 3.5 times the ratio between the equivalent focal length and the relative aperture of the whole objective, that of the second and fifth components lying between 4 and 13 times the said ratio, and that of the third and fourth components lying between 2 and 3 times the said ratio, where the said ratio lies between F/2 and F/4.

5. An optical objective as claimed in claim 1, in which the sum of the axial thicknesses of the second and fifth components lies between one-quarter and two-thirds of the overall axial length of the objective.

6. An optical objective as claimed in claim 5, in which the arithmetic mean of the curvatures of the front surface of the second component and the rear surface of the fifth component lies between 1.4 and 2.2 times that of the four surfaces of the third and fourth components.

7. An optical objective as claimed in claim 6, in which the sum of the axial lengths of the front and rear air spaces is less than .02 times the equivalent focal length of the objective.

8. An optical objective as claimed in claim 1, in which the sum of the axial thicknesses of the second and fifth components lies between one-quarter and two-thirds of the overall axial length of the objective.

9. An optical objective as claimed in claim 8, in which the arithmetic mean of the curvatures of the front surface of the second component and the rear surface of the fifth component lies between 1.4 and 2.2 times that of the four surfaces of the third and fourth components.

10. An optical objective as claimed in claim 9, in which the sum of the axial lengths of the front and rear air spaces is less than .02 times the equivalent focal length of the objective.

11. An optical objective as claimed in claim 2, in which the sum of the axial lengths of the front and rear air spaces is less than .02 times the equivalent focal length of the objective.

12. An optical objective as claimed in claim 1, in which the sum of the axial lengths of the front and rear air spaces is less than .02 times the equivalent focal length of the objective.

References Cited in the file of this patent

UNITED STATES PATENTS

| | | |
|---|---|---|
| 871,559 | Beck | Nov. 19, 1907 |
| 1,361,207 | Warmisham | Dec. 7, 1920 |
| 2,348,667 | Warmisham | May 9, 1944 |
| 2,664,783 | Cook | Jan. 5, 1954 |

FOREIGN PATENTS

| | | |
|---|---|---|
| 427,008 | Great Britain | Apr. 12, 1935 |